United States Patent
Matsuoka et al.

(10) Patent No.: US 8,536,826 B2
(45) Date of Patent: Sep. 17, 2013

(54) DATA PROCESSING SYSTEM, ELECTRONIC VEHICLE AND MAINTENANCE SERVICE SYSTEM

(75) Inventors: Kazunari Matsuoka, Kawasaki (JP); Akira Yamazaki, Kawasaki (JP); Jun Miyake, Kawasaki (JP); Masayuki Hirokawa, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 319 days.

(21) Appl. No.: 12/874,036

(22) Filed: Sep. 1, 2010

(65) Prior Publication Data
US 2011/0066309 A1 Mar. 17, 2011

(30) Foreign Application Priority Data
Sep. 15, 2009 (JP) ................................. 2009-212701

(51) Int. Cl.
 H02J 7/00 (2006.01)
 B60L 11/18 (2006.01)
 H04L 9/32 (2006.01)
(52) U.S. Cl.
 CPC ........... H02J 7/0004 (2013.01); B60L 11/1824 (2013.01); H04L 9/3271 (2013.01); H02J 2007/0001 (2013.01)
 USPC .............. 320/106; 701/22; 702/187; 702/188
(58) Field of Classification Search
 CPC ............ B60L 11/1824; H01M 10/482; H01M 10/4257; H02J 7/0004; H02J 2007/0001; G01R 31/007; G01R 31/3658; G01R 31/3689
 USPC ................... 701/22; 702/187, 188; 320/106
 See application file for complete search history.

(56) References Cited

U.S. PATENT DOCUMENTS

| | | | |
|---|---|---|---|
| 6,975,092 B2 * | 12/2005 | Edington et al. .............. | 320/106 |
| 7,227,335 B2 * | 6/2007 | Sakakibara et al. ........... | 320/132 |
| 7,613,924 B2 * | 11/2009 | Shankar et al. ............... | 713/168 |
| 7,863,858 B2 * | 1/2011 | Gangstoe et al. ............. | 320/106 |
| 7,994,908 B2 * | 8/2011 | Tonegawa et al. ............ | 340/538 |
| 8,102,248 B2 * | 1/2012 | Yasuda et al. ............... | 340/426.1 |
| 8,232,875 B2 * | 7/2012 | Uchida .......................... | 340/455 |
| 2009/0115653 A1 * | 5/2009 | Katrak et al. ................. | 341/173 |
| 2009/0133119 A1 | 5/2009 | Kato et al. | |
| 2010/0010698 A1 * | 1/2010 | Iwashita et al. .................. | 701/22 |
| 2010/0057282 A1 * | 3/2010 | Katrak et al. .................... | 701/22 |

* cited by examiner

Primary Examiner — James Trammell
Assistant Examiner — Todd Melton
(74) Attorney, Agent, or Firm — Womble Carlyle

(57) ABSTRACT

An electric vehicle information system prevents circulation of non-authentic batteries and battery components for electric vehicles. An electric vehicle data processing system is employed that performs, on an electric vehicle battery module having a plurality of battery cells installed therein, authentication of individual battery cells and the battery module itself in a hierarchical manner using a microcomputer. An electric vehicle is configured so as to cause the microcomputer of the data processing system to accumulate voltage history and charge history of the batteries in a nonvolatile storage circuit. The history information and the electric vehicle ID can be gathered by a maintenance device and a data server via an electronic control unit of the electric vehicle. A maintenance service system may thus be provided.

21 Claims, 5 Drawing Sheets

DATA PROCESSING SYSTEM, ELECTRONIC VEHICLE AND MAINTENANCE SERVICE SYSTEM

CROSS-REFERENCE TO RELATED APPLICATION

The disclosure of Japanese Patent Application No. 2009-212701 filed on Sep. 15, 2009 including the specification, drawings and abstract is incorporated herein by reference in its entirety.

BACKGROUND OF THE INVENTION

The present invention relates to authentication of a battery module (charge battery module) mounted on an electric vehicle (referring to both an automobile having only an electric motor as a running power source, and a hybrid car having an electric motor and an internal-combustion engine as the running power source), operation control of an electric vehicle according to the authentication result, acquisition of management information of the battery module, and maintenance service using the acquired management information, and relates to a technology that can be effectively applied to a plug-in type electric vehicle and a maintenance system thereof, for example.

A plug-in type electric vehicle is required to have a number of battery modules mounted thereon in order to secure a large electric power capacity, and thus the share of cost of battery modules relative to the electric vehicle is very large. In view of this, it is considered desirable to reject imitations of battery modules of electric vehicles. There has been conventionally proposed a technology that distinguishes imitations from genuine products through authentication of consumables. For example, International Patent Publication WO/2007/132518 describes a technology that uses an authentication microcomputer for mutual authentication between a PC and a battery pack. Thereby it is determined whether the mounted battery pack is genuine or not.

SUMMARY OF THE INVENTION

Inventors of the present invention however discovered that a method of simply distinguishing between a genuine product and an imitation of consumables such as a small battery pack in a PC is not sufficient as an authentication method for a battery mounted on an electric vehicle. Because a battery on an electric vehicle includes a plurality of battery modules and each of the battery modules includes a plurality of battery cells, it is not realistic to treat the batteries on an electric vehicle as a single-unit battery and determine whether it is a genuine product or an imitation. If the performance of a part of the battery modules degrades, only the degraded part of the battery modules can be replaced. In addition, it is also conceivable as an imitation method to mount imitation battery cells on a module case of authentic battery modules, as well as imitating a battery module unit. Hence, when authentication of batteries for an electric vehicle is performed using a microcomputer, effective authentication cannot be performed unless the unit and the range of authentication are optimized. It is concerned that fire accidents due to abnormal charging or the like may occur if poor-quality imitations of battery cells and battery modules to be mounted on electric vehicles circulate. Furthermore, battery manufacturers will suffer financial loss due to circulation of non-authentic batteries, which may inhibit widespread use of electric vehicles.

The inventors of the invention further discovered that authentication of a battery mounted on an electric vehicle is only one aspect of identity management of a battery and, in terms of battery management, it does not suffice to simply manage the voltage or lifetime of an authentic battery. That is, reliability of the price of a used electric vehicle in which the battery has a large share in the price may be weakened if information such as the number of charging times indicating the battery performance is falsified. For example, there is a concern about illicitly selling used battery cells or automobiles disguised as brand-new items or new old stocks by falsifying maintenance information such as charge history of battery cells, battery modules, or a battery management unit mounted on an automobile.

The present invention has been made in view of the above circumstances and provides a data processor and also an electric vehicle that may contribute to preventing circulation of illicit electric vehicle batteries and their component parts.

It is another object of the invention to provide an electric vehicle and also a maintenance service system that can easily take effective measures against falsification of charge history or the like of electric vehicle batteries.

The other purposes and the new feature of the present invention will become clear from the description of the present specification and the accompanying drawings.

The following explains briefly the outline of a system in accordance with one embodiment of the present invention.

A data processing system is employed to perform, on an electric vehicle battery module having a plurality of battery cells installed therein, authentication of individual battery cells and the battery module itself in a hierarchical manner using a microcomputer.

The microcomputer of this data processing system accumulates voltage histories and charge histories of the batteries in a nonvolatile storage circuit and allow the history information to be gathered together with the ID of the automobile by a maintenance device or a data server via an electronic control unit. So an automobile and a maintenance service system is constructed as such.

The following explains briefly the effect of a system in accordance with one embodiment of the present invention.

The data processing system according to the invention may thus prevent circulation of illicit electric vehicle batteries and their component parts.

In addition, the automobile and the maintenance service system according to the invention facilitate taking effective measures against falsification of charge history or the like of electric vehicle batteries.

DETAILED DESCRIPTION

1. Outline of an Embodiment

Figure 1:
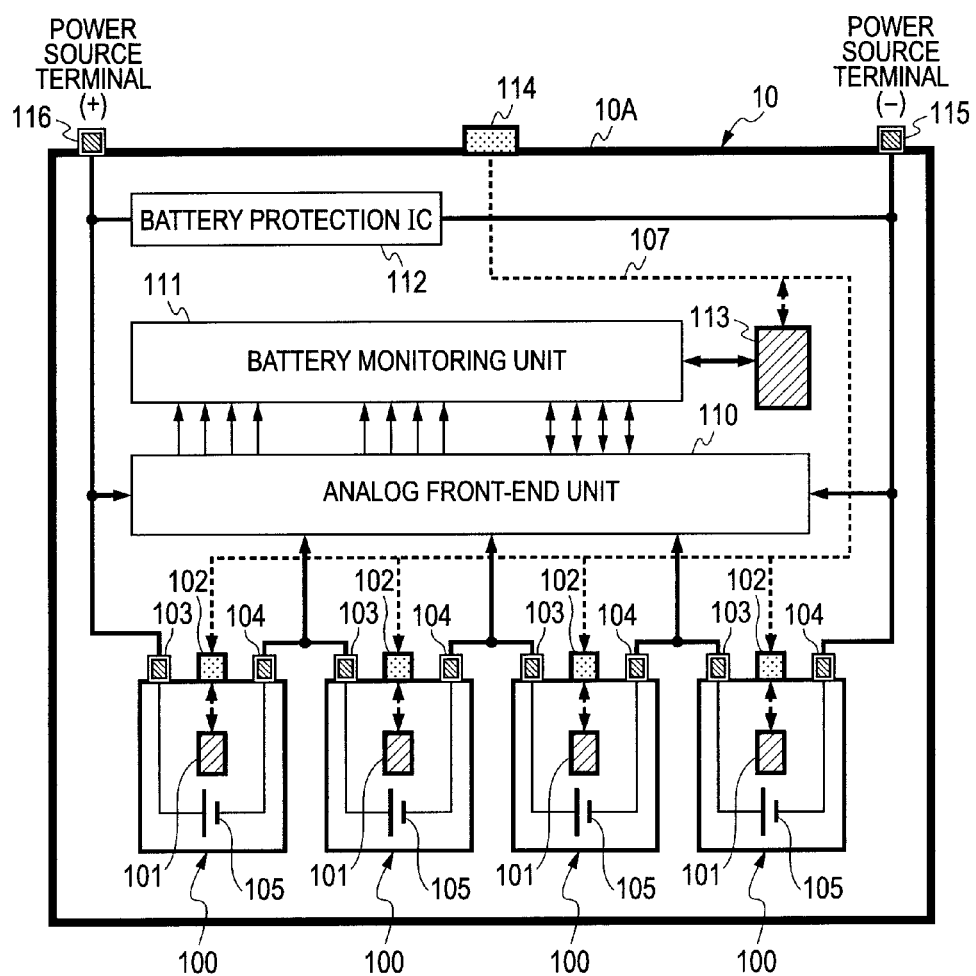
FIG. 1 is an explanatory diagram illustrating a battery module mounted on an electric vehicle according to the invention.

First an outline of a representative embodiment of the invention disclosed in this application is described in a number of paragraphs. Reference numerals of the drawings that are parenthesized and referred to in the outline of the representative embodiment are only examples included in the concept of the components referred to thereby.

Paragraph [1] A data processing system according to a representative embodiment of the invention is mounted on an electric vehicle battery module (10) having a plurality of battery cells (100) installed in a module case. The module case (10A) includes a first microcomputer (113) (referred to herein as a "module microcomputer" or "module authentication microcomputer") coupled to each battery cell, and an interface terminal (114) that allows the first microcomputer (module microcomputer) to interface with the outside of the module case. Each battery cell includes an electronic circuit (101) that outputs a response signal to a signal output from the first microcomputer (module microcomputer 113). Upon receiving a battery authentication instruction from the interface terminal, the first microcomputer (module microcomputer) causes the electronic circuit of each battery cell to output a response signal, and if a response signal of any of the battery cells is invalid, notifies the fact to the outside that at least one of the battery cells, and thus the battery module itself, is invalid and therefore not authentic, and if response signals of all battery cells are valid, notifies the outside from the interface terminal of a response in order to show to the outside, that the first microcomputer (module microcomputer), and thus the battery module itself, is valid and therefore authentic. In the present context, "invalid" and "not authentic" may refer to a situation in which an item is either counterfeit (e.g., not from an approved source), or has been tampered with (e.g., has falsified charging history), or both.

Because authentication of individual battery cells and the battery module itself is performed in a hierarchical manner using the first microcomputer (module microcomputer), the invention can address not only when the battery module is imitated as a unit but also when an imitation battery cell is mounted on the module case of an authentic battery module, and hence circulation of illicit battery products can be prevented.

Paragraph [2] In the data processing system of paragraph [1], the electronic circuit is a second microcomputer (101) (referred to herein as a "cell microcomputer" or "cell authentication microcomputer"). Upon receiving a battery authentication instruction from the interface terminal, the first microcomputer (module microcomputer), performs battery cell authentication using each second microcomputer (cell microcomputer), and if the authentication result of any of the battery cells is invalid, notifies the fact to the outside, and if the authentication results of all battery cells are valid, notifies the outside from an external interface terminal of a response for authentication in order to show to the outside, that the first microcomputer (module microcomputer), is valid.

With regard to battery cells, it also becomes possible to perform a high-level authentication of individual battery cells by mounting a microcomputer therein.

Paragraph [3] The data processing system of paragraph [2] includes a battery monitoring circuit (110, 111) that monitors the output voltage of each battery cell and the voltage of the voltage terminal of the battery module. The first microcomputer (module microcomputer), has a nonvolatile storage circuit (121) that stores the history of the voltage monitored by the battery monitoring circuit (110, 111).

It becomes possible to maintain the history of the output voltage of the battery cells and the battery module itself.

Paragraph [4] In the data processing system of paragraph [3], the first microcomputer (module microcomputer), stores the charge history of the battery module in the nonvolatile storage circuit.

It becomes possible to maintain the charge history of the battery module.

Paragraph [5] In the data processing system of paragraph [4], the charge history includes the voltage applied to the voltage terminal of the battery module and the application time thereof for each charging operation.

Using the charge history, it becomes possible to analyze the stress applied to the battery module according to the charging voltage and charging time.

Paragraph [6] In the data processing system of paragraph [5], the first microcomputer (module microcomputer), outputs the voltage history and the charge history stored in the nonvolatile storage circuit from the interface terminal to the outside, in response to an appropriate instruction from the interface terminal.

It becomes possible to hand over the process using the voltage history and the charge history to the outside, and hence an analysis exceeding the processing ability of the first microcomputer (module microcomputer), becomes possible.

Paragraph [7] In the data processing system of paragraph [6], the first microcomputer (module microcomputer), is a microcomputer that has also been certified by the evaluation/certification authority of ISO/IEC15408. Reliability of the authentication process can be easily raised.

Paragraph [8] In the data processing system of paragraph [7], the second microcomputer (cell microcomputer) is a microcomputer that has been certified by the evaluation/certification authority of ISO/IEC15408. Reliability of the authentication process can be easily raised.

Paragraph [9] An electric vehicle (1) according to another embodiment of the invention includes a plurality of battery modules (10) mounted thereon, each having a data processing system installed in a module case (10A) together with a plurality of battery cells (100), and the electric vehicle further comprises an electronic control unit (13) coupled to each of the battery modules. Each battery module has a first microcomputer (module microcomputer 113) coupled to each battery cell and an interface terminal (114) that allows the first microcomputer (module microcomputer) to interface with the outside of the module case. The battery cell has an electronic circuit (101) that outputs a response signal to a signal output from the first microcomputer (module microcomputer). Upon receiving a battery authentication instruction from the electronic control unit, the first microcomputer (module microcomputer) causes the electronic circuit of each battery cell to output a response signal, and if a response signal of any of the battery cells is invalid, responds by notifying the electronic control unit of the fact, and if response signals of all battery cells are valid, responds by notifying the electronic control unit that the first microcomputer (module microcomputer) is valid. The electronic control unit permits starting an electric motor if the responses of all battery modules returned from their respective module microcomputers are valid.

Because authentication of individual battery cells and the battery module itself is performed in a hierarchical manner using the first microcomputer (module microcomputer), the invention can address when the entire battery module is imitated as a unit and also when an imitation battery cell is mounted on the module case of an authentic battery module, and hence circulation of illicit battery products can be prevented.

Paragraph [10] The electric vehicle of paragraph [9] comprises a communication unit (14) coupled to the electronic control unit. The battery module includes a battery monitoring circuit (110, 111) that, upon receiving the output voltage of each battery cell and the voltage of the voltage terminal of the battery module, monitors a voltage thereof. The first microcomputer (module microcomputer) includes a nonvolatile storage circuit (121) that stores the history of the voltage monitored by the battery monitoring circuit.

It becomes possible to maintain the history of the output voltage of the battery cells and the battery module itself.

Paragraph [11] In the electric vehicle of paragraph [10], the first microcomputer (module microcomputer) stores the charge history of the battery module in the nonvolatile storage circuit.

It becomes possible to maintain the charge history of the battery module.

Paragraph [12] In the electric vehicle of paragraph [11], the charge history includes the voltage applied to the voltage terminal of the battery module and the application time thereof for each charging operation.

Using the charge history, it becomes possible to analyze the stress applied to the battery module according to the charging voltage and charging time.

Paragraph [13] In the electric vehicle of paragraph [12], the electronic control unit causes the communication unit to transmit the voltage history and the charge history stored in the nonvolatile storage circuit together with automobile ID information, in response to the instruction received from the communication unit.

It becomes possible to maintain and use, at the outside of the electric vehicle, the voltage history and the charge history together with the automobile ID information.

Paragraph [14] A maintenance service system according to yet another embodiment of the invention is a system comprising a maintenance device (20) that supports maintenance of a plug-in type electric vehicle and a data server (30) that manages performance information of the electric vehicle. The electric vehicle includes a plurality of battery modules (10) having a plurality of battery cells installed therein, an electronic control unit (13) coupled to each of the battery modules, and a communication unit (14) coupled to the electronic control unit. The battery module includes a first microcomputer (module microcomputer 113) and a battery monitoring circuit (110, 111) that monitors the output voltage of each battery cell and the voltage of the voltage terminal of the battery module, and the first microcomputer (module microcomputer) includes a nonvolatile storage circuit (121) that stores history of the voltage monitored by the battery monitoring circuit. The electronic control unit causes the communication unit to transmit the voltage history stored in the nonvolatile storage circuit together with automobile ID information to the maintenance device (20), in response to an appropriate instruction that the communication unit received from the maintenance device.

Because it becomes possible to use the voltage history by the maintenance device in association with the automobile ID information and it also becomes possible to perform a high-level analysis of the voltage history, for example, an electric vehicle dealer can easily perform detailed and thorough maintenance service for the battery state of the electric vehicle bearing the ID.

Paragraph [15] In the maintenance service system of paragraph [14], the first microcomputer (module microcomputer) stores the charge history of the battery module in the nonvolatile storage circuit. The electronic control unit causes the communication unit to transmit the charge history stored in the nonvolatile storage circuit together with the automobile ID information to the maintenance device, in response to an appropriate instruction that the communication unit received from the maintenance device.

Because it becomes possible to use the charge history by the maintenance device in association with the automobile ID information and it also becomes possible to perform a high-level analysis of battery degradation, for example, based on the charge history, an electric vehicle dealer can easily perform detailed and thorough maintenance service for the battery state of the electric vehicle bearing the ID.

Furthermore, even if the number of battery charging times or the like has been falsified in the electric vehicle, it can be easily detected by responding to inquiry of the history based on the ID information.

Paragraph [16] In the maintenance service system of paragraph [15], the charge history includes the voltage applied to the voltage terminal of the battery module and the application time thereof for each charging operation.

It becomes useful for analysis of the stress applied to the battery by charging.

Paragraph [17] In the maintenance service system of paragraph [16], the electric vehicle includes a charger (16) that charges the battery module with power supplied from a charge plug via a power supply cable (402). The charger is capable of power line communication with the outside using the power supply cable, and also capable of interfacing with the electronic control unit. The electronic control unit causes the charger to transmit the voltage history stored in the nonvolatile storage circuit together with the automobile ID information to the data server (30) via power line communication, in response to an appropriate instruction that the charger received from the data server via power line communication.

It becomes possible to accumulate and use the voltage history in the data server via the charger.

Paragraph [18] In the maintenance service system of paragraph [17], the electronic control unit causes the charger to transmit the charge history stored in the nonvolatile storage circuit together with the automobile ID information to the data server via power line communication, in response to an appropriate instruction that the charger received from the data server via power line communication.

It becomes possible to accumulate and use the charge history in the data server via the charger.

Paragraph [19] In the maintenance service system of paragraph [18], the data server is coupled to a plurality of charging stations (40) and the charging station performs power line communication with the charger coupled by the charge plug. It becomes easy to increase the frequency of accumulating the voltage history and the charge history to the data server for each of regularly performed charging operations.

2. Detailed Description of Embodiment

The embodiment is described in more detail below.

FIG. 1 illustrates an exemplary battery module mounted on an electric vehicle according to the invention. A battery module 10 includes, for example, a plurality of battery cells 100 installed in a module case 10A, where the power of the battery cells 100 can be taken out from positive and negative power source terminals 116 and 115. A battery cell 100 includes a battery element 105 coupled to positive and negative power source terminals 103 and 104 and a cell authentication microcomputer 101 as an exemplary electronic circuit. As a data processing system for voltage monitoring and battery authentication, the module case 10A includes, for example, a module authentication microcomputer 113 as an example of the module microcomputer coupled to the cell authentication microcomputer 101 of each battery cell 100 via a battery cell data terminal 102, a bus 107, an interface terminal 114 that allows the module authentication microcomputer 113 to interface with the outside of the module case 10A, an analog front-end unit 110, a battery monitoring unit 111, and a battery protection IC 112 coupled between the power source terminals 115 and 116.

Upon receiving a battery authentication instruction at the interface terminal 114 from the outside, the module authentication microcomputer 113 performs battery cell authentication using the cell authentication microcomputer 101 of each battery cell 100, and if the authentication result of any of the battery cells 100 is invalid, notifies the fact to the outside, and if the authentication results of all battery cells 100 are valid, outputs a response for authentication to the outside from the interface terminal 114 in order to show to the outside, that the module authentication microcomputer 113 and thus the corresponding battery module 10 are valid.

Figure 2:
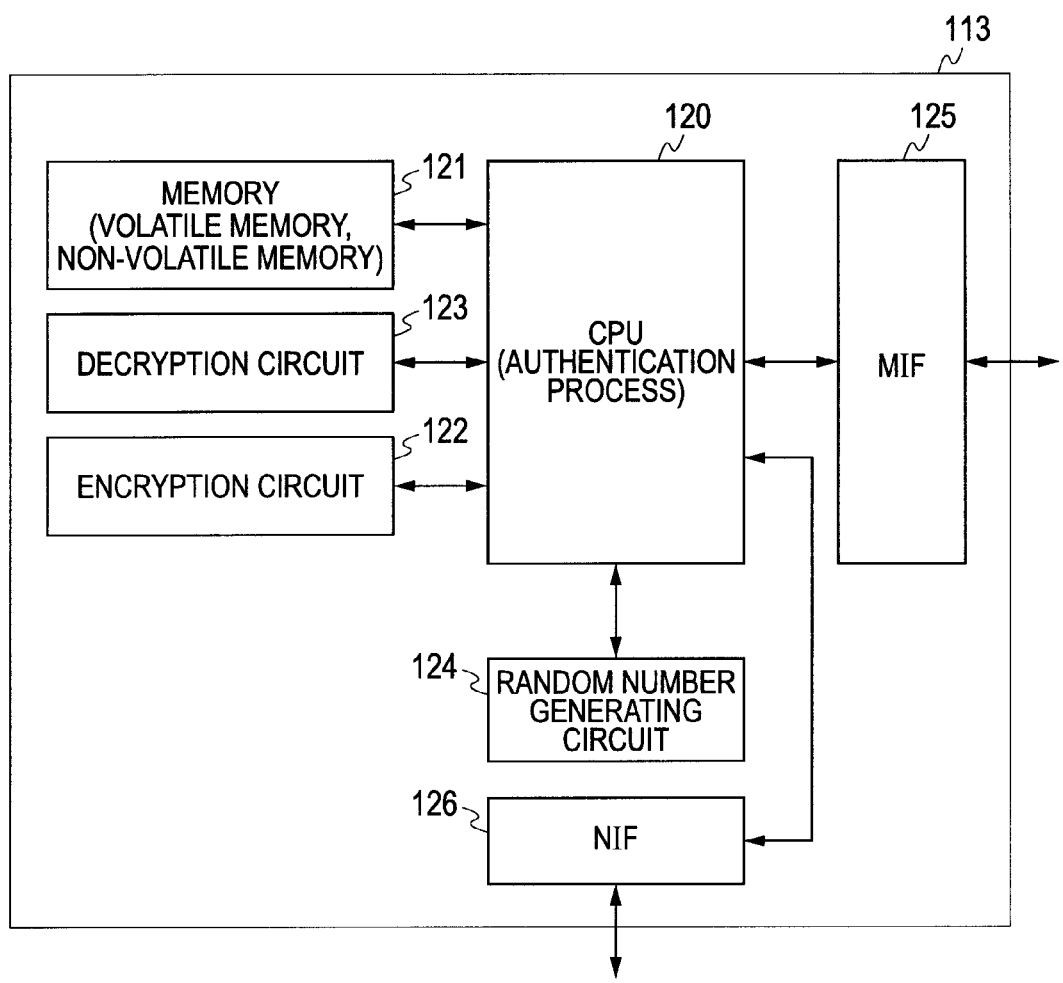
FIG. 2 is a block diagram illustrating an authentication microcomputer.

The module authentication microcomputer 113 includes, as illustrated in FIG. 2, a central processing unit (CPU) 120, a memory 121 that collectively refers to a volatile memory (volatile storage circuit) such as SRAM and a nonvolatile memory (nonvolatile storage circuit) such as a flash memory, an encryption circuit 122, a decryption circuit 123 that decrypts a secret code, a random number generating circuit 124, an interface circuit (MIF) 125, and an interface circuit (NIF) 126, which are formed in a single semiconductor substrate. The CPU 120 executes a program stored in the memory 121 to perform data processing such as authentication or data transfer. The memory 121, particularly the nonvolatile memory thereof, is used to store information such as the voltage history and the charge history described below with regard to the battery module 10. For example, the random number generating circuit 124 generates a random number as a challenge code for use in an authentication process, and the CPU 120 generates an encryption key for use in the authentication process according to the operation program. The interface circuit (MIF) 125 is coupled to the bus 107, for example, and the interface circuit (NIF) 126 is coupled to the battery monitoring unit 111. Although not particularly shown, the cell authentication microcomputer 101 of the battery cell 100 is configured similarly as the module authentication microcomputer 113.

In one embodiment, authentication of the battery cell 100 by the module authentication microcomputer 113 can be performed using a symmetric key encryption protocol. The microcomputers 113 and 101 share a first encryption key, and the module microcomputer 113 generates a challenge code (character string generated using the random number generating circuit) and transmits it to the cell microcomputer 101. The cell microcomputer 101 that received the challenge code encrypts the challenge code using its own encryption circuit and transmits the encrypted challenge code to the module microcomputer 113. The module microcomputer 113 decrypts the encrypted challenge code using the first encryption key and determines whether it agrees with the transmitted challenge code, and if agrees, the module microcomputer 113 determines that the cell microcomputer 101 i.e. the battery cell 100 is authentic. The authentication is performed for all battery cells 100, and the result is stored in the memory 121 with the ID of the battery cell (battery cell ID).

Authentication of the battery module 10 from the outside is performed as follows. An external authentication microcomputer, such as the system authentication microcomputer 131, and the module microcomputer 113 share a second encryption key, the external authentication microcomputer generates a challenge code (character string generated by the random number generating circuit) and transmits it to the module microcomputer 113 via an external interface 114. The module microcomputer 113 that received the challenge code encrypts the challenge code using its own encryption circuit and transmits the encrypted challenge code to the external microcomputer as a response for authentication. The external microcomputer decrypts the encrypted challenge code with the second encryption key, determines whether or not it agrees with the transmitted challenge code, and if it agrees, determines that the module microcomputer 113 i.e. the battery module 10 is authenticated. It is understood that the first and second encryption need not be the same.

Because the battery module 10 performs authentication of individual battery cells 100 and the battery module 10 itself in a hierarchical manner using the module authentication microcomputer 113, the invention can address imitating the battery module 10 as a unit and also mounting an imitation battery cell 100 on the module case 10A of an authentic battery module 10, and thus circulation of illicit products of electric vehicle batteries can be prevented. Because the battery cell 10 also mounts the microcomputer therein, a high-level authentication process can be easily realized for individual battery cells and also for the battery module.

The analog front-end unit 110 receives the voltage between the terminals 103 and 104 of individual battery cells 100 (voltage between cell terminals), and the voltage between the power source terminals 116 and 115 of the battery module 10 (voltage between module terminals), and converts them to a digital value (voltage data). The battery monitoring unit 111 receives the voltage data, monitors whether the voltage between cell terminals and the voltage between module terminals have reached a predetermined voltage, and provides the monitoring result to the module microcomputer 113. The module microcomputer 113 performs a process of warning of a voltage drop according to the monitoring result.

In addition, the module microcomputer 113 performs a process to sequentially store, for example at evenly spaced time intervals, in the nonvolatile storage circuit of the memory 121, the history of the voltage between cell terminals and the voltage between module terminals monitored by the battery monitoring unit 111 in association with a battery cell ID (ID information of a battery cell). In summary, it becomes possible for the battery module 10 to maintain the history of the output voltage of the battery cells 100 and the battery module 10 itself. Furthermore, the module microcomputer 113 stores the charge history of the battery module 10 in the nonvolatile storage circuit of the memory 121. The charge history includes, for example, the voltage applied between the power source terminals 115 and 116 of the battery module (voltage between module terminals), the voltage applied between the terminals 103 and 104 of the battery cell (voltage between cell terminals), and the application time thereof for each charging operation. The battery monitoring unit 111 detects that charging was performed by detecting the voltage rise between module terminals.

The nonvolatile storage circuit stores the voltage between cell terminals in association with the battery cell ID (ID information of a battery cell) and the voltage between module terminals in association with the battery module ID (ID information of a battery module). Using the charge history, it becomes possible to analyze the stress applied to the battery module according to the charging voltage and charging time. The higher the charging voltage is and the longer the charging time is, the larger the stress applied to the battery module becomes, resulting in a shorter lifetime for the same number of charging times.

The module microcomputer 113 may representatively maintain the complete voltage history and the charge history in the nonvolatile storage circuit, or each cell microcomputer 101 may maintain the information of its own voltage history and charge history, or a configuration may be possible in which both of them maintain the information.

In addition, generation of information of the voltage history and the charge history to be stored in the nonvolatile storage circuit is not limited to the operation of the module microcomputer 113, and it may be performed by an external microcomputer such as a system microcomputer 131 of an electronic control unit 13 described below, for example, based on data processing ability. With regard to the place of storing the information of the voltage history and the charge history, the system microcomputer 131 can store the information of the entire voltage history and charge history, or the module microcomputer 113 can store information of the voltage history and the charge history of the corresponding battery module, or the cell microcomputer 101 can store information of the voltage history and the charge history of the corresponding battery cell. Maintaining the information of the voltage history and the charge history by a lower-level microcomputer can be replaced by maintaining the information by a higher-level microcomputer. The battery monitoring unit 111 may be respectively provided to each battery module, or a plurality of battery modules may be monitored by a single battery monitoring unit. It is assumed in the description of FIG. 5 below that microcomputers 131, 113 and 101 respectively maintain required information of the voltage history and the charge history.

The module microcomputer 113 outputs the voltage history and the charge history stored in the nonvolatile storage circuit from the interface terminal to the outside, in response to an appropriate instruction from the interface terminal. Hence, it becomes possible to hand over the process that uses the voltage history and the charge history to the outside, and thus it becomes possible to perform analyses that exceeds the processing ability of the module microcomputer 113.

Although it becomes easier to raise the reliability of the authentication process by using, as the authentication microcomputers 113 and 101, a microcomputer that has been certified by the evaluation/certification authority of ISO/IEC15408, it is not essential in the invention to use such a microcomputer as the authentication microcomputers 113 and 101, and it is obvious to be able to use a microcomputer that is not certified by the evaluation/certification authority of ISO/IEC15408.

Figure 3:
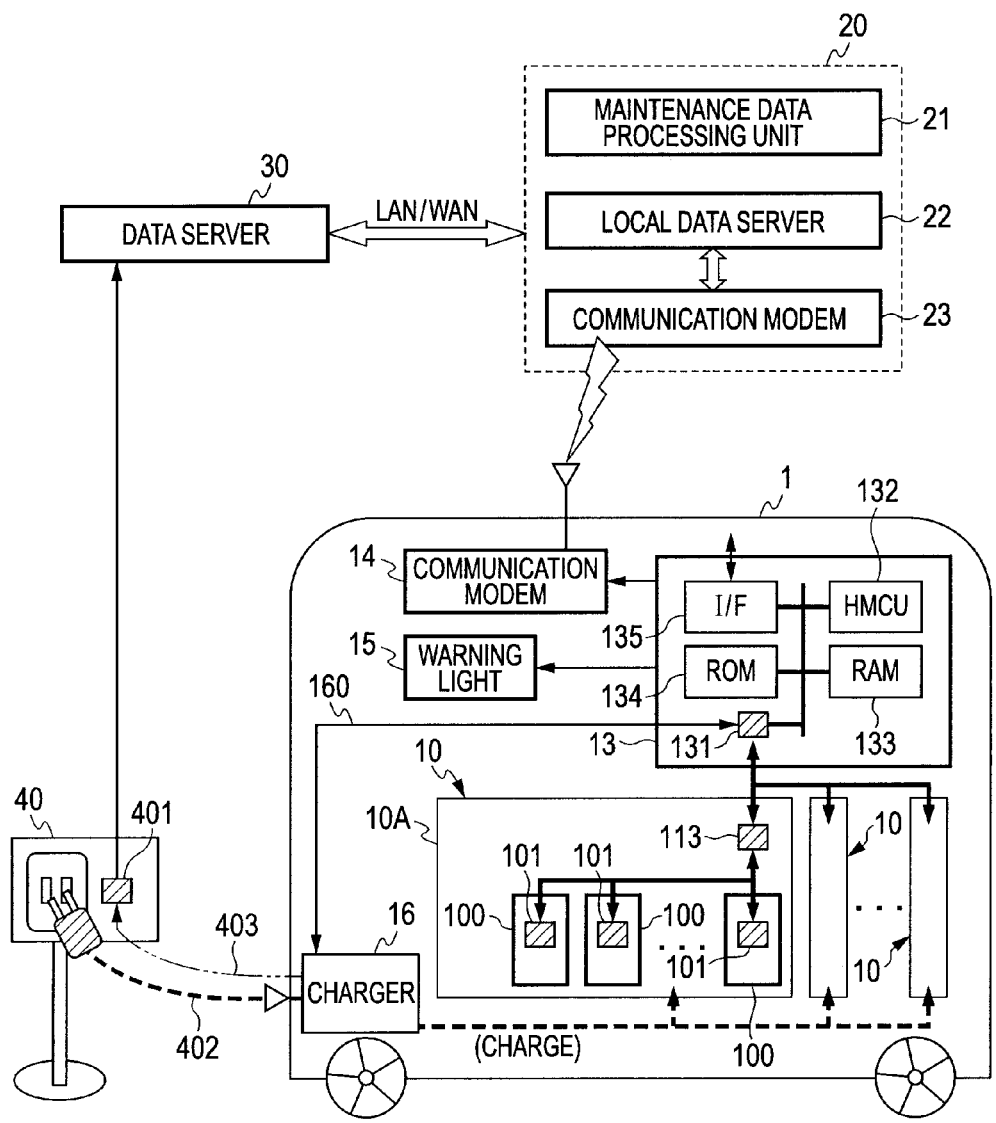
FIG. 3 is a block diagram illustrating an exemplary electric vehicle and a maintenance service system thereof according to the invention.

FIG. 3 illustrates an exemplary electric vehicle and a maintenance service system thereof according to the invention. The electric vehicle 1 shown in the FIG. 3 has a plurality of the above-mentioned battery modules 10 mounted thereon and runs by an electric motor (not shown) driven by charging voltage of the mounted battery modules 10. Because the drive system is not a subject matter of the invention, detailed description thereof is omitted.

The electric vehicle 1 includes a plurality of electronic control units (ECU) where computerized control is employed for the power train or the body and so forth. FIG. 3 representatively illustrates one such electronic control unit 13. The illustrated electronic control unit 13 functions as a battery management unit, although not particularly limited thereto, which is coupled to the module authentication microcomputer 113 of each battery module 10 via an vehicle-mounted network such as CAN (Controller Area Network) and also coupled to a communication modem 14, a battery warning light 15 relating to the battery, and a charger 16. The charger 16 charges the battery module 10 with power supplied from the charge plug via the power supply cable 402. The charger 16 can perform power line communication with the outside using the power supply cable 402. Reference numeral 403 schematically shows a communication signal by the power line communication.

The electronic control unit 13 includes, although not particularly limited thereto, a host microprocessor (HMCU) 132 that controls the entire electronic control unit 13, a ROM 134 that stores a program performed by the host microprocessor 132, a RAM 133 used as a work area of the host microprocessor 132, an external interface controller (I/F) 135 coupled to the communication modem 14 and the warning light 15, and the system authentication microcomputer 131. Although not illustrated, the system authentication microcomputer 131 is configured similarly as FIG. 2. The system authentication microcomputer 131 is interfaced with the outside via the communication modem 14, interfaced with the outside via power line communication by the charger 16, and is coupled to the module authentication microcomputer 113 to perform the battery authentication, acquire the voltage history and the charge history, and perform host transfer control, described below, of the acquired voltage history and the charge history.

The maintenance service system of the electric vehicle 1 comprises a maintenance device 20 that supports maintenance of the electric vehicle 1, a data server 30 that has the maintenance device 20 coupled thereto via a LAN (Local Area Network) or a WAN (Wide Area Network), for example, and manages performance information of the electric vehicle, and a charging station 40 coupled to the data server 30.

The maintenance device 20, which is possessed by an automobile manufacturer or an automobile dealer and so forth, includes a maintenance data processor 21, a local data server 22, and a communication modem 23. Although only one maintenance device 20 is illustrated, actually there can be many of them. Similarly, there are also a number of automobiles, with each automobile 1 having automobile ID (identification) information in the non-volatile storage of the system authentication microcomputer 131. The communication modem 23 performs wireless communication with the communication modem 14 of the automobile 1. The charger 16 is interfaced with the system authentication microcomputer 131 via a bus 160.

The charging station 40 supplies power to the charger 16 of the automobile connected by the power cable 402, and is also signal-interfaced with the charger 16 via power line communication using a microcomputer 401. The microcomputer 401 can communicate with the data server 30.

The data server 30 functions as a host server of a number of maintenance devices 20 and charging stations 40.

When the communication modem 14 receives an appropriate instruction from the maintenance device 20 to gather maintenance information, the electronic control unit 13 of the automobile 1 causes the communication modem 14 to transmit the voltage history and the charge history stored in the nonvolatile storage circuit of system authentication microcomputer 131 together with the automobile ID information to the maintenance device 20, in response to the instruction. Because it becomes possible to use the voltage history and the charge history by the maintenance device 20 in association with the automobile ID information and it also becomes possible to perform a high-level analysis of the voltage history, for example, the electric vehicle dealer can easily perform detailed and thorough maintenance service for the battery state of the electric vehicle bearing the ID. Furthermore, even if the number of battery charging times or the like has been falsified in the electric vehicle 1, it can be easily detected by responding to inquiry of the history from the maintenance device 20 based on the ID information. The ID information and the history information gathered by the maintenance device 20 are accumulated in the data server 30.

When the charger 16 is connected to the charging station 40 with the power cable 402, the electronic control unit 13 of the automobile 1, upon receiving an appropriate instruction from the data server 30 to gather maintenance information via the charger 16 and the microcomputer 401 of the charging station 40, provides the voltage history and the charge history stored in the nonvolatile storage circuit of the system authentication microcomputer 131 together with the vehicle ID information to the microcomputer 401 from the charger 16 via power line communication, in response to the received instruction. The history information provided to the microcomputer 401 is then transmitted to the data server 30.

The data server 30 includes storage configured to store the prior voltage history and charging history of a plurality of battery modules (and possibly also the history of each battery cell thereof) for each of a plurality of electric vehicles. The data server is configured to use the vehicle ID to associate the newly received voltage history and charging history with the prior history of the identified vehicle.

In another embodiment, the data server 30 may be further configured to validate the electric vehicle and/or its battery modules/cells using a comparator configured to compare the newly received voltage history and charging history with the prior history. Should any errors, discrepancies, inconsistencies, or the like be found, the data server 30 may set an error flag and/or send a first signal indicative of invalidity or non-authentication. Should no errors, discrepancies, inconsistencies, or the like be found none, the data server 30 may set a "no error" flag and/or send a second signal indicative of validity or authentication.

The maintenance information accumulated in the data server can be downloaded by the maintenance device 20 as necessary and used for maintenance similarly as described above.

Figure 4:
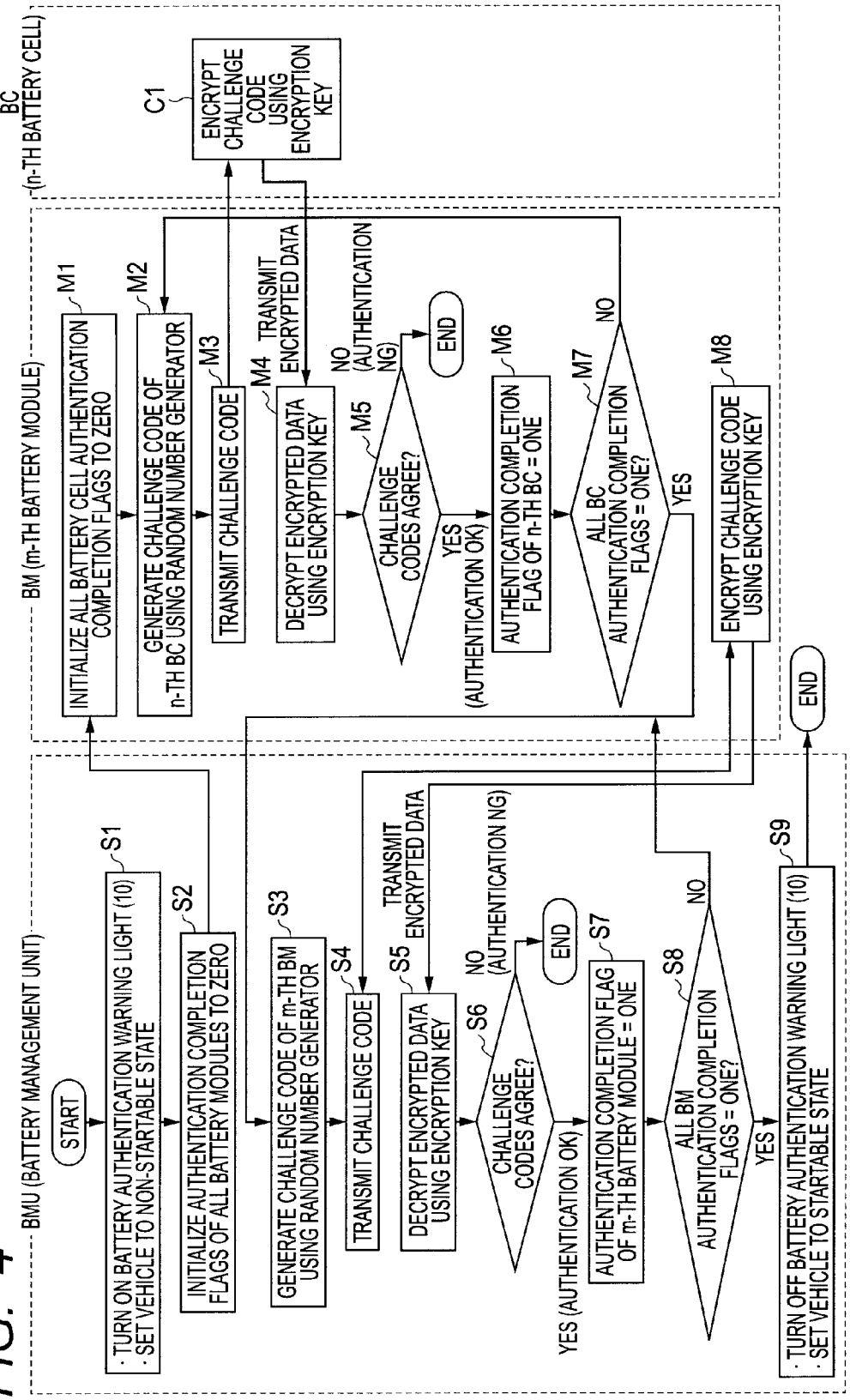
FIG. 4 is a flow chart illustrating a process of the battery authentication procedure.

FIG. 4 shows a procedure of the battery authentication process. The process is generally divided into a process by the system microcomputer 131 of the electronic control unit 13, a process by the module microcomputer 113 of the battery module 10, and a process by the cell microcomputer 101 of the battery cell 100. The battery authentication process is performed at the starting time of the automobile.

When the electric vehicle is powered on, the warning light 15 turns on, the electric vehicle is brought into a non-drivable state (S1), and authentication completion flags of all battery modules are initialized to zero (S2). Subsequently, all authentication completion flags of the first battery module are initialized to zero (M1), a challenge code is generated (M2) and transmitted to the first battery cell (M3). The battery cell encrypts the challenge code using an encryption key and returns it to the battery module (C1). The battery module decrypts the returned encrypted challenge code using an encryption key (M4), determines whether the decrypted challenge code agrees with the challenge code transmitted at step M3 (M5), terminates the process if they do not agree, and sets the authentication completion flag of the battery cell to one if they agree (M6). The above process is repeated until authentication of all battery cells is completed (M7).

When an authentication process of a single battery module is completed, the fact is notified to the system microcomputer 131 of the electronic control unit 13. The system microcomputer 131 that has been notified generates a challenge code for the module microcomputer 113 of the battery module (S3) and transmits it to the module microcomputer 113 (S4). The module microcomputer 113, upon receiving the challenge code, encrypts it using an encryption key and returns the result to the system microcomputer 131 (M8). The system microcomputer 131 decrypts the returned encrypted challenge code using the encryption key (S5) and determines whether the decrypted challenge code agrees with the challenge code transmitted at step S4 (S6), terminates the process if they do not agree and sets the authentication completion flag of the battery module to one if they agree (S7).

The above process is repeated until authentication of all battery modules is completed (S8). When the authentication process of all battery modules and battery cells has been completed (all authentication results are valid), the system microcomputer 131 of the electronic control unit 13 turns off the warning light 15 and brings the electric vehicle into a drivable state (S9). If disagreement of the challenge codes occurs, electric vehicle is maintained in a non-drivable state, for example.

At the time of automobile inspection or repair, one may change a battery cell or a battery module whose lifetime has expired due to repeated charge/discharge, or remove a discharged battery module and replace it with a charged battery module at a charging station. In either case, the present invention contemplates a mechanism to prevent the vehicle from starting if authentication is not fulfilled due to replacement with an imitation battery module or battery cell.

Figure 5:
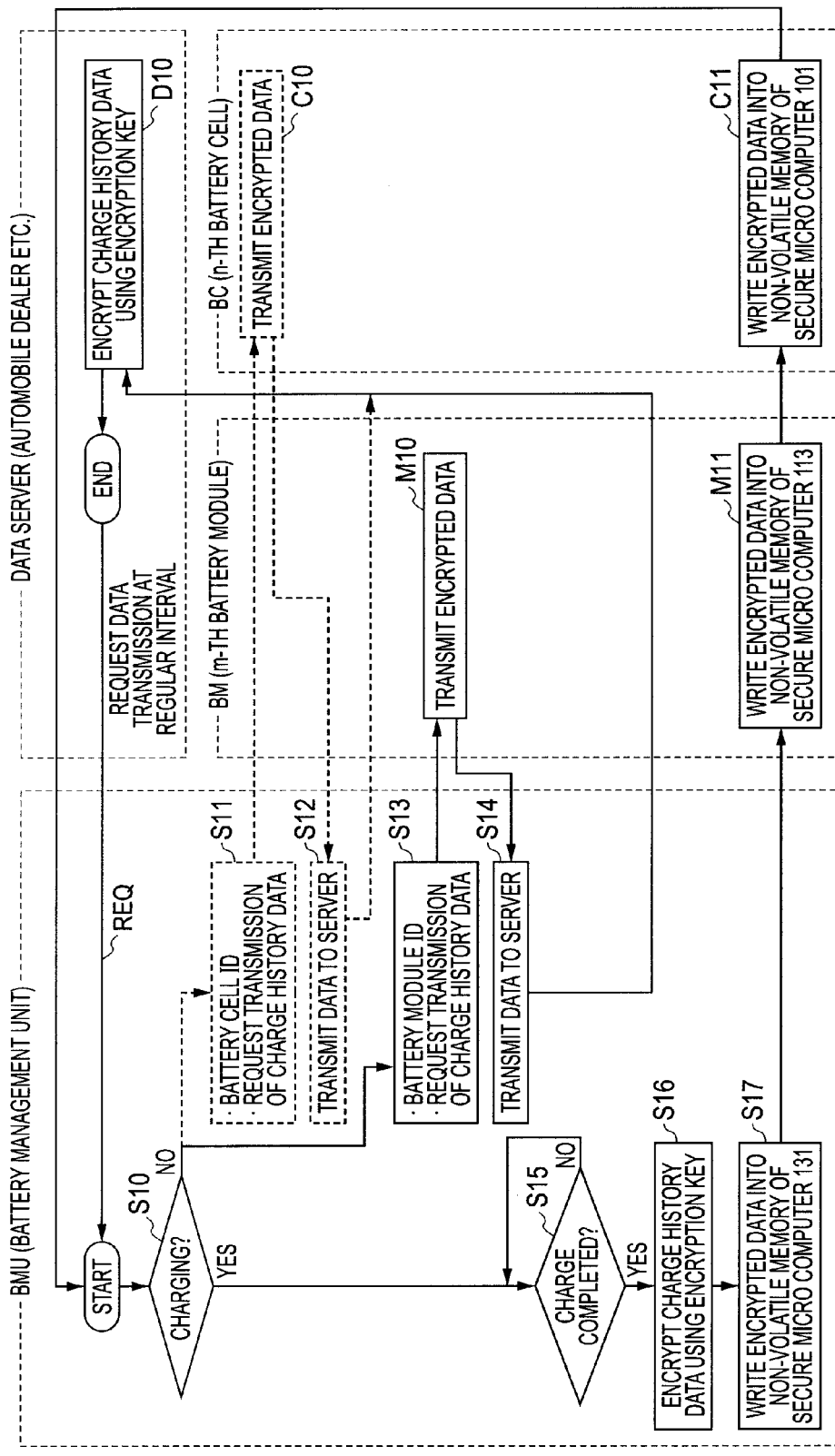
FIG. 5 is a flow chart illustrating gathering of maintenance information.

FIG. 5 illustrates an exemplary procedure of gathering maintenance information. When the maintenance device 20 (or the data server 30 via the maintenance device 20) requests the electronic control unit 13 of the electric vehicle 1 (REQ) to gather maintenance information, the system microcomputer 131 of electronic control unit 13 determines whether charging is currently in process (S10).

If charging is not in process, the ECU 13 requests transfer of a first battery module ID and the information of the charge history and the voltage history (S13), and the battery module that receives the request encrypts the information of the charge history and the voltage history and returns it to the system microcomputer 131 (M10). The information of the charge history and the voltage history, being associated with each battery cell ID in a one to one correspondence, is further associated with the battery module ID and is also transferred (S14) to the maintenance device 20 (or the data server 30 via the maintenance device 20) and accumulated therein (D10). This process is repeated for each battery module.

When the cell microcomputer 101 of a battery cell also stores the information of the charge history and the voltage history of the battery cell in its nonvolatile storage circuit in association with the battery cell ID, it may request (S11) transfer of the battery cell ID and the information of the charge history and the voltage history, and the battery cell that receives the request may encrypt the information of the charge history and the voltage history and return it to the system microcomputer 131 (C10). In this case, the information of the charge history and voltage history is associated with the battery cell ID and transferred (S12) to the maintenance device 20 (or the data server 30 via the maintenance device 20) and accumulated therein (D10).

If it is determined at step S10 that charging is in process, the system waits until charging is completed (S15) and, although not particularly limited thereto, the system microcomputer 131 generates the charge history data of the charging (S16), stores information of the generated voltage history and the charge history in the nonvolatile storage circuit of the system microcomputer 131 (S17), stores, for each battery module, the corresponding history information in the nonvolatile storage circuit of the module microcomputer 113 (M11), and stores, for each battery cell, the corresponding history information in the nonvolatile storage circuit of the cell microcomputer 101 (C11). The process then returns to step S10 again to transfer the latest history information to the maintenance device 20 (or the data server 30 via the maintenance device 20).

According to the electric vehicle and the service network system described above, the following operational effect can be achieved.

By performing authentication of the battery cell or the battery module from the automobile side and setting so that the automobile cannot be started without an authenticatable battery or notifying the user thereof by a warning light, fire accidents due to abnormal charging caused by the user using a poor-quality imitation battery cell or battery module can be prevented. Furthermore, financial loss of battery manufacturers due to circulation of non-authentic batteries can be prevented.

Although there is a concern about illicitly selling used battery cells, battery modules, or automobiles disguised as brand-new items or new old stocks by falsifying maintenance information such as the charge history of the battery cells, the battery modules, or the battery management unit, illicit acts can be prevented because falsification of the information becomes difficult by employing a secure microcomputer.

Maintenance information such as the ID number or the charge history recorded in the nonvolatile storage circuit of the microcomputer of the battery cell, the battery module, and the battery management unit can be used as service data for notification of maintenance or replacement time.

The authentication system using a microcomputer that has been certified by the evaluation/certification authority of ISO/IEC15408 can be configured as a highly secure authentication system which is robust against physical attacks, information leakage attacks, malfunction attacks, because it is difficult to break the security unless the microcomputer LSI is analyzed.

Although the invention made by the inventors has been described based on specific embodiments, it is needless to say that the invention is not limited to the embodiments and a variety of modification is possible without deviating from the scope thereof.

For example, mutual authentication may be employed for the authentication process by the microcomputer. By installing a child-card function of a credit card on the microcomputer of the battery management unit, payment of charging fee or items purchased at a charging station can be made by the automobile simply pulling into the charging station without having to bring cash, a prepaid card, or a credit card. When making a payment, the owner of the electric vehicle (1) can be authenticated by inputting a password into the charger.

It is also possible to add an anti-theft function of the automobile in a wire-connection system by PLC. Measures can be taken such as to keep the ID data of the stolen automobile in the charger and, when the stolen automobile is coupled with the charger to perform mutual authentication for charging, refuse charging if the ID data kept in the battery management unit agrees with the ID of the stolen automobile, or transmit, to the data server of the automobile manufacturer or the dealer, location information of the charging station where the stolen automobile attempted to perform charging.

What is claimed is:

1. An electric vehicle data processing system mounted on an electric vehicle battery module having a plurality of battery cells installed in a module case, wherein:
    the module case includes a first microcomputer coupled to each battery cell and an interface terminal that allows the first microcomputer to interface with an outside of the module case;
    each battery cell includes an electronic circuit that outputs a response signal, in response to a first signal from the first microcomputer;
    the first microcomputer, upon receiving a battery authentication instruction from the interface terminal, causes the electronic circuit of each battery cell to output a response signal;
    if the response signal of any of the battery cells is invalid, the first microcomputer notifies the outside that at least one of the battery cells is not authentic; and
    if the response signals of all battery cells are valid, the first microcomputer notifies the outside that the first microcomputer is authentic.

2. The electric vehicle data processing system according to claim 1, wherein:
    the electronic circuit comprises a second microcomputer;
    the first microcomputer performs, upon receiving a battery authentication instruction from the interface terminal, battery cell authentication using each second microcomputer;
    if an authentication result of any of the battery cells is invalid, the first microcomputer notifies the outside that at least one of the battery cells is not authentic; and
    if authentication results of all battery cells are valid, the first microcomputer computer notifies the outside that the first microcomputer is authentic.

3. The electric vehicle data processing system according to claim 2, further comprising:
    a battery monitoring circuit that monitors the output voltage of each battery cell and the voltage of a voltage terminal of the battery module, wherein:
    the first microcomputer has a nonvolatile storage circuit that stores the history of the voltage monitored by the battery monitoring circuit.

4. The electric vehicle data processing system according to claim 3, wherein:
    the first microcomputer stores a charge history of the battery module in the nonvolatile storage circuit.

5. The electric vehicle data processing system according to claim 4, wherein:
    the charge history includes a voltage applied to the voltage terminal of the battery module and an application time thereof, for each charging operation.

6. The electric vehicle data processing system according to claim 5, wherein:
    the first microcomputer outputs the voltage history and the charge history stored in the nonvolatile storage circuit from the interface terminal to the outside, in response to an instruction from the interface terminal.

7. The electric vehicle data processing system according to claim 6, wherein:
    the first microcomputer is a microcomputer that has, at some point, been certified by the evaluation/certification authority ISO/IEC15408.

8. The electric vehicle data processing system according to claim 7, wherein:
    the second microcomputer is a microcomputer that has, at some point, been certified by the evaluation/certification authority ISO/IEC15408.

9. The electric vehicle data processing system according to claim 2, wherein:
    the first microcomputer and the second microcomputer share an encryption key; and
    battery cell authentication comprises encryption and decryption of a challenge code.

10. The electric vehicle data processing system according to claim 9, wherein:
    the first microcomputer provides an encrypted challenge code to each battery cell; and
    the first microcomputer notifies the outside that the first microcomputer is authentic, only if each of the plurality of battery cells successfully decrypts the encrypted challenge code.

11. The electric vehicle data processing system according to claim 2, wherein:
the battery authentication instruction from the interface terminal comprises an encrypted challenge code; and
the first microcomputer notifies the outside that the first microcomputer is authentic, only if the first microcomputer is able to decrypt the encrypted challenge code.

12. An electric vehicle including a plurality of battery modules mounted thereon, each battery module having a data processing system installed in a module case together with a plurality of battery cells, the electric vehicle comprising:
an electronic control unit coupled to each of the battery modules, wherein:
each battery module has a first microcomputer coupled to each battery cell and an interface terminal that allows the first microcomputer to interface with an outside of the module case, and each battery cell has an electronic circuit that outputs a response signal in response to a first signal from the first microcomputer;
the first microcomputer of a given battery module causes, upon receiving a battery authentication instruction from the electronic control unit, the electronic circuit of each associated battery cell to output a response signal;
if the response signal of any of the battery cells is invalid, the first microcomputer notifies the electronic control unit that at least one of the battery cells is not authentic; and
if the response signals of all battery cells are valid, the first microcomputer notifies the electronic control unit that the first microcomputer is authentic; and
the electronic control unit permits starting an electric motor only upon receiving notification that the first microcomputers of all the battery modules are authentic.

13. The electric vehicle according to claim 12, further comprising:
a communication unit coupled to the electronic control unit, and wherein:
each battery module includes a battery monitoring circuit which monitors an output voltage of each battery cell and a voltage of a voltage terminal of the battery module; and
the first microcomputer includes a nonvolatile storage circuit that stores a history of the voltages monitored by the battery monitoring circuit.

14. The electric vehicle according to claim 13, wherein:
the first microcomputer stores a charge history of the battery module in the nonvolatile storage circuit.

15. The electric vehicle according to claim 14, wherein:
the charge history includes a voltage applied to the voltage terminal of the battery module and an application time thereof, for each charging operation.

16. The electric vehicle according to claim 15, wherein:
the electronic control unit causes the communication unit to transmit the voltage history and the charge history stored in the nonvolatile storage circuit together with vehicle ID information, in response to an instruction received from the communication unit.

17. An electric vehicle battery module comprising:
a plurality of battery cells; and
an integrated battery module authentication system comprising:
a first microcomputer configured to receive and respond to a battery module authentication instruction; and
an electronic circuit associated with each battery cell, the electronic circuit of each battery cell being coupled to said first microcomputer;
wherein:
in response to said battery module authentication instruction, the first microcomputer is configured to:
determine whether at least one of the battery cells is not authentic;
output a first signal representing that the battery module is not authentic, if at least one of the battery cells is determined to be not authentic; and
output a second signal representing that the battery module is authentic, if none of the battery cells are determined to be not authentic.

18. The electric vehicle battery module according to claim 17, wherein:
the electronic circuit associated with each battery cell comprises a second microcomputer; and
the first microcomputer and each battery cell's second microcomputer share an encryption key.

19. An electric vehicle battery authentication system for an electric vehicle having a plurality of battery modules, comprising:
a system microcomputer connected to each of said plurality of battery modules and configured to:
determine whether at least one of the battery modules is not authentic by sending and receiving a response to at least one battery module authentication instruction;
output a first signal, if at least one of the battery modules is determined to be not authentic; and
output a second signal, if none of the battery modules is determined to be not authentic;
wherein each battery module comprises:
a plurality of battery cells; and
an integrated battery module authentication system comprising:
a first microcomputer configured to receive and respond to said battery module authentication instruction; and
an electronic circuit associated with each battery cell, the electronic circuit of each battery cell being coupled to said first microcomputer;
wherein:
in response to said battery module authentication instruction, the first microcomputer is configured to:
determine whether at least one of the battery cells is not authentic;
output a first signal, if at least one of the battery cells is determined to be not authentic; and
output a second signal, if none of the battery cells is determined to be not authentic.

20. An electric vehicle maintenance history information system comprising:
a data server coupled to a plurality of electric vehicle charging stations, each configured to communicate with a charger of an electric vehicle via power line communication, when the electric vehicle is connected to that electric vehicle charging stations for a charging operation;
wherein the data server is configured to:
send, via that electric vehicle charging station and to the electric vehicle, a first instruction to gather maintenance information; and
in response to the first instruction, receive from the electric vehicle's charger via power line communication with that electric vehicle charging station, voltage and charge history about each of plurality of battery modules belonging to a battery of the electric vehicle; and wherein each battery module comprises:
a plurality of battery cells; and
an integrated battery module authentication system comprising:
a first microcomputer configured to receive and respond to said battery module authentication instruction; and
an electronic circuit associated with each battery cell, the electronic circuit of each battery cell being coupled to said first microcomputer;
wherein:
in response to said battery module authentication instruction, the first microcomputer is configured to:
determine whether at least one of the battery cells is not authentic;
output a first signal, if at least one of the battery cells is determined to be not authentic; and
output a second signal, if none of the battery cells is determined to be not authentic.

21. An electric vehicle maintenance history information system configured to receive and store voltage and charge history of a plurality of electric vehicles, comprising:
a data server; and
at least one electric vehicle charging station coupled to the data server, the electric vehicle charging station being configured to communicate, via power line communication, with a charger of an electric vehicle that has been connected to the electric vehicle charging station for a charging operation;

wherein the data server is configured to:
send, via the electric vehicle charging station and to the electric vehicle, a first instruction to gather maintenance information; and
in response to the first instruction, receive from the electric vehicle's charger via power line communication with the electric vehicle charging station, voltage and charge history about each of plurality of battery modules belonging to an battery of the electric vehicle; and
wherein each battery module comprises:
a plurality of battery cells; and
an integrated battery module authentication system comprising:
a first microcomputer configured to receive and respond to said battery module authentication instruction; and
an electronic circuit associated with each battery cell, the electronic circuit of each battery cell being coupled to said first microcomputer;
wherein:
in response to said battery module authentication instruction, the first microcomputer is configured to:
determine whether at least one of the battery cells is not authentic;
output a first signal, if at least one of the battery cells is determined to be not authentic; and
output a second signal, if none of the battery cells is determined to be not authentic.

\* \* \* \* \*